US008077177B2

(12) United States Patent
Moore et al.

(10) Patent No.: US 8,077,177 B2
(45) Date of Patent: Dec. 13, 2011

(54) METHOD FOR LOADING AND DISPLAYING GRIDDED DATA BY DETERMINING THE USEFULNESS OF A PARTICULAR VERTEX

(76) Inventors: Jason A. Moore, Taberg, NY (US); Aaron W. McVay, Ava, NY (US)

( * ) Notice: Subject to any disclaimer, the term of this patent is extended or adjusted under 35 U.S.C. 154(b) by 1034 days.

(21) Appl. No.: 12/002,854

(22) Filed: Dec. 12, 2007

(65) Prior Publication Data

US 2008/0250309 A1 Oct. 9, 2008

Related U.S. Application Data

(60) Provisional application No. 60/879,211, filed on Dec. 15, 2006.

(51) Int. Cl.
*G06T 17/00* (2006.01)
*G06T 15/30* (2011.01)
*G06T 15/10* (2011.01)

(52) U.S. Cl. ......................... 345/428; 345/423; 345/427

(58) Field of Classification Search .......... 345/418–420, 345/423, 587; 382/226, 240
See application file for complete search history.

(56) References Cited

U.S. PATENT DOCUMENTS

| | | | | |
|---|---|---|---|---|
| 6,313,837 | B1 * | 11/2001 | Assa et al. | 345/420 |
| 6,373,489 | B1 * | 4/2002 | Lu et al. | 345/428 |
| 2001/0039487 | A1 * | 11/2001 | Hammersley et al. | 703/2 |
| 2007/0064005 | A1 * | 3/2007 | Antoine | 345/473 |
| 2010/0013829 | A1 * | 1/2010 | Baxes | 345/419 |

OTHER PUBLICATIONS

Pajarola, Renato. Oct. 1998. Large scale terrain visualization using the restricted quadtree triangulation. In Proceedings of the conference on Visualization '98 (VIS '98). IEEE Computer Society Press, Los Alamitos, CA, USA, p. 19-26.*

* cited by examiner

*Primary Examiner* — Xiao M. Wu
*Assistant Examiner* — Andrew Shin

(57) ABSTRACT

Method, computer executable program and apparatus for displaying massive amounts of potentially non-uniform gridded data through the use of view dependant refinement. An initial minimal representation is created. A view dependant refinement criterion is then used to ascertain the perceived quality. If necessary, refinements and decimations to the current representation are performed. The representation is then provided to graphics hardware for display.

3 Claims, 10 Drawing Sheets

Step 4: Assign Children Tree Nodes

Step 5: Link Index Nodes together

Step 2: Create 16 new IndexNodes

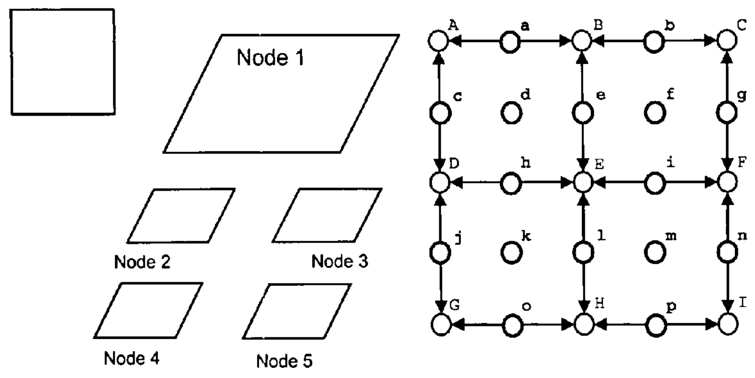

TreeNode Data Structures

| Node1 | Node2 | Node3 | Node4 | Node5 |
|---|---|---|---|---|
| v0 = E | v0 = null | v0 = null | v0 = null | v0 = null |
| v1 = B | v1 = null | v1 = null | v1 = null | v1 = null |
| v2 = A | v2 = null | v2 = null | v2 = null | v2 = null |
| v3 = D | v3 = null | v3 = null | v3 = null | v3 = null |
| v4 = G | v4 = null | v4 = null | v4 = null | v4 = null |
| v5 = H | v5 = null | v5 = null | v5 = null | v5 = null |
| v6 = I | v6 = null | v6 = null | v6 = null | v6 = null |
| v7 = F | v7 = null | v7 = null | v7 = null | v7 = null |
| v8 = C | v8 = null | v8 = null | v8 = null | v8 = null |
| NW = Node2 | NW = null | NW = null | NW = null | NW = null |
| NE = Node3 | NE = null | NE = null | NE = null | NE = null |
| SW = Node4 | SW = null | SW = null | SW = null | SW = null |
| SE = Node5 | SE = null | SE = null | SE = null | SE = null |

Step 3: Assign new IndexNodes

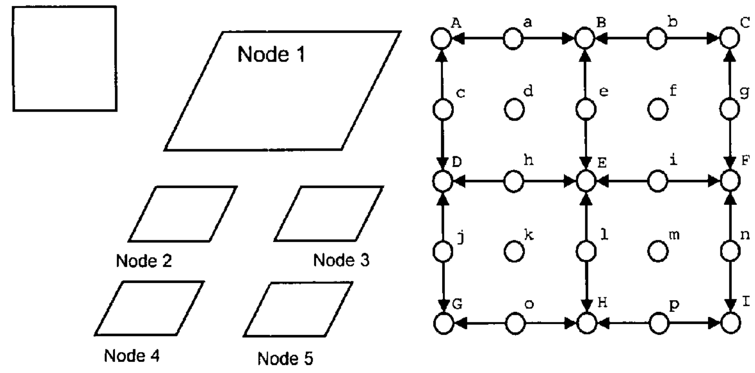

TreeNode Data Structures

| Node1 | Node2 | Node3 | Node4 | Node5 |
|---|---|---|---|---|
| v0 = E | v0 = d | v0 = f | v0 = k | v0 = m |
| v1 = B | v1 = a | v1 = b | v1 = h | v1 = i |
| v2 = A | v2 = A | v2 = B | v2 = D | v2 = E |
| v3 = D | v3 = c | v3 = e | v3 = j | v3 = l |
| v4 = G | v4 = D | v4 = E | v4 = G | v4 = H |
| v5 = H | v5 = h | v5 = i | v5 = o | v5 = p |
| v6 = I | v6 = E | v6 = F | v6 = H | v6 = I |
| v7 = F | v7 = e | v7 = g | v7 = l | v7 = n |
| v8 = C | v8 = B | v8 = C | v8 = E | v8 = F |
| NW = Node2 | NW = null | NW = null | NW = null | NW = null |
| NE = Node3 | NE = null | NE = null | NE = null | NE = null |
| SW = Node4 | SW = null | SW = null | SW = null | SW = null |
| SE = Node5 | SE = null | SE = null | SE = null | SE = null |

FIGURE 3B

Step 4: Assign Children Tree Nodes

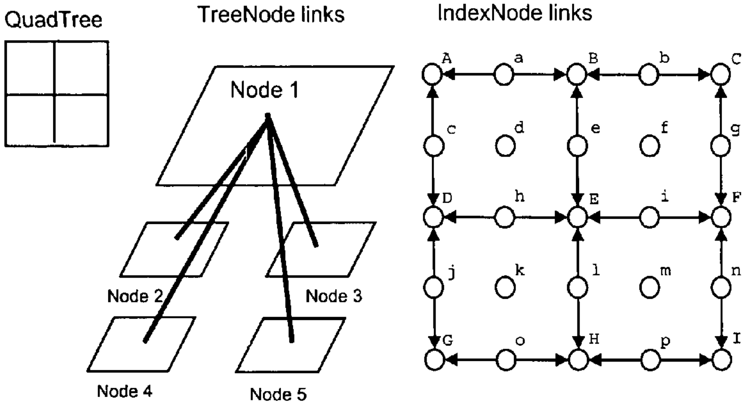

TreeNode Data Structures

| Node1 | Node2 | Node3 | Node4 | Node5 |
|---|---|---|---|---|
| v0 = E | v0 = d | v0 = f | v0 = k | v0 = m |
| v1 = B | v1 = a | v1 = b | v1 = h | v1 = i |
| v2 = A | v2 = A | v2 = B | v2 = D | v2 = E |
| v3 = D | v3 = c | v3 = e | v3 = j | v3 = l |
| v4 = G | v4 = D | v4 = E | v4 = G | v4 = H |
| v5 = H | v5 = h | v5 = i | v5 = o | v5 = p |
| v6 = I | v6 = E | v6 = F | v6 = H | v6 = I |
| v7 = F | v7 = e | v7 = g | v7 = l | v7 = n |
| v8 = C | v8 = B | v8 = C | v8 = E | v8 = F |
| NW = Node2 | NW = null | NW = null | NW = null | NW = null |
| NE = Node3 | NE = null | NE = null | NE = null | NE = null |
| SW = Node4 | SW = null | SW = null | SW = null | SW = null |
| SE = Node5 | SE = null | SE = null | SE = null | SE = null |

Step 5: Link Index Nodes together

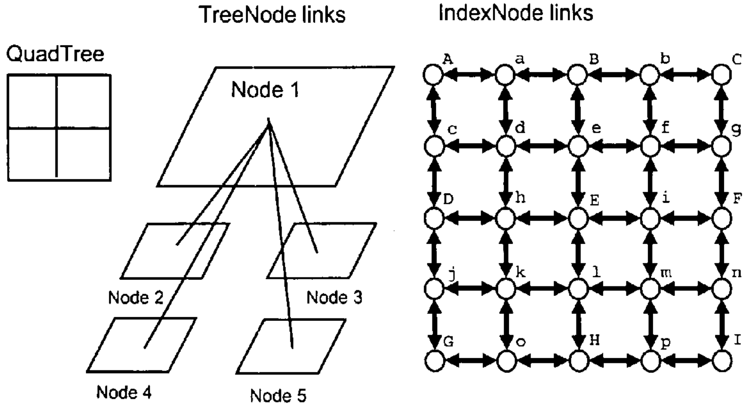

TreeNode Data Structures

| Node1 | Node2 | Node3 | Node4 | Node5 |
|---|---|---|---|---|
| v0 = E | v0 = d | v0 = f | v0 = k | v0 = m |
| v1 = B | v1 = a | v1 = b | v1 = h | v1 = i |
| v2 = A | v2 = A | v2 = B | v2 = D | v2 = E |
| v3 = D | v3 = c | v3 = e | v3 = j | v3 = l |
| v4 = G | v4 = D | v4 = E | v4 = G | v4 = H |
| v5 = H | v5 = h | v5 = i | v5 = o | v5 = p |
| v6 = I | v6 = E | v6 = F | v6 = H | v6 = I |
| v7 = F | v7 = e | v7 = g | v7 = l | v7 = n |
| v8 = C | v8 = B | v8 = C | v8 = E | v8 = F |
| NW = Node2 | NW = null | NW = null | NW = null | NW = null |
| NE = Node3 | NE = null | NE = null | NE = null | NE = null |
| SW = Node4 | SW = null | SW = null | SW = null | SW = null |
| SE = Node5 | SE = null | SE = null | SE = null | SE = null |

FIGURE 3C

Initial State

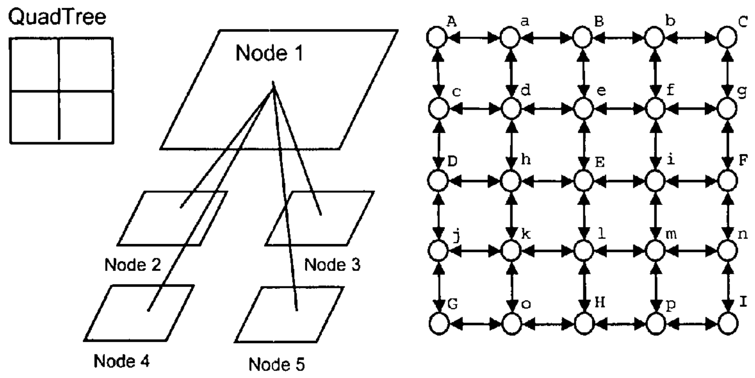

TreeNode Data Structures

| Node1 | Node2 | Node3 | Node4 | Node5 |
|---|---|---|---|---|
| v0 = E | v0 = d | v0 = f | v0 = k | v0 = m |
| v1 = B | v1 = a | v1 = b | v1 = h | v1 = i |
| v2 = A | v2 = A | v2 = B | v2 = D | v2 = E |
| v3 = D | v3 = c | v3 = e | v3 = j | v3 = l |
| v4 = G | v4 = D | v4 = E | v4 = G | v4 = H |
| v5 = H | v5 = h | v5 = i | v5 = o | v5 = p |
| v6 = I | v6 = E | v6 = F | v6 = H | v6 = I |
| v7 = F | v7 = e | v7 = g | v7 = l | v7 = n |
| v8 = C | v8 = B | v8 = C | v8 = E | v8 = F |
| NW = Node2 | NW = null | NW = null | NW = null | NW = null |
| NE = Node3 | NE = null | NE = null | NE = null | NE = null |
| SW = Node4 | SW = null | SW = null | SW = null | SW = null |
| SE = Node5 | SE = null | SE = null | SE = null | SE = null |

Step 1) Unlink 16 IndexNodes

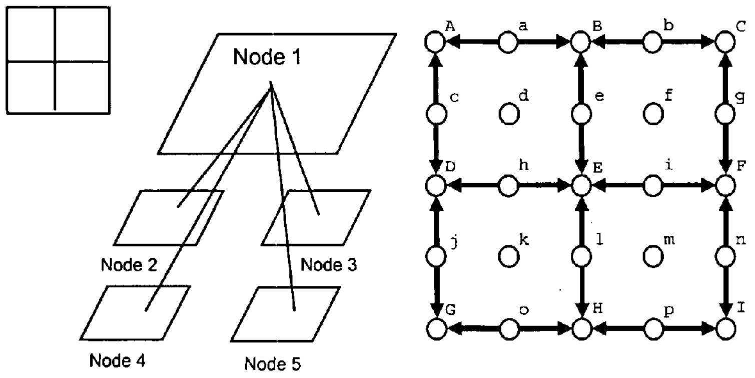

TreeNode Data Structures

| Node1 | Node2 | Node3 | Node4 | Node5 |
|---|---|---|---|---|
| v0 = E | v0 = d | v0 = f | v0 = k | v0 = m |
| v1 = B | v1 = a | v1 = b | v1 = h | v1 = i |
| v2 = A | v2 = A | v2 = B | v2 = D | v2 = E |
| v3 = D | v3 = c | v3 = e | v3 = j | v3 = l |
| v4 = G | v4 = D | v4 = E | v4 = G | v4 = H |
| v5 = H | v5 = h | v5 = i | v5 = o | v5 = p |
| v6 = I | v6 = E | v6 = F | v6 = H | v6 = I |
| v7 = F | v7 = e | v7 = g | v7 = l | v7 = n |
| v8 = C | v8 = B | v8 = C | v8 = E | v8 = F |
| NW = Node2 | NW = null | NW = null | NW = null | NW = null |
| NE = Node3 | NE = null | NE = null | NE = null | NE = null |
| SW = Node4 | SW = null | SW = null | SW = null | SW = null |
| SE = Node5 | SE = null | SE = null | SE = null | SE = null |

FIGURE 7A

METHOD FOR LOADING AND DISPLAYING GRIDDED DATA BY DETERMINING THE USEFULNESS OF A PARTICULAR VERTEX

PRIORITY CLAIM UNDER 35 U.S.C. §119(e)

This patent application claims the priority benefit of the filing date of a provisional application, Ser. No. 60/879,211 filed in the United States Patent and Trademark Office on Dec. 15, 2006.

STATEMENT OF GOVERNMENT INTEREST

The invention described herein may be manufactured and used by or for the Government for governmental purposes without the payment of any royalty thereon.

BACKGROUND OF THE INVENTION

There exists a need to display high resolution terrain data (e.g. Digital Terrain Elevation Data (DTED)) from global to high-resolution scales. To a limited extent this type of task has been accomplished using free distribution applications such as Google Earth™. Specifically, what is needed is a method for loading and managing massive, gridded, datasets of the type available from the National Geospatial Intelligence Agency (NGA) and the US Geological Survey (USGS).

Brute force computing methods for loading or displaying such voluminous data at the global level exceed the current capabilities of modern processing hardware. The only way to achieve the desired visual quality and interactive speed is to use real-time algorithms that vary the quality of the displayed content. Such algorithms would necessarily feature 1) a data structure for storing, manipulating, and processing of vertex information, and 2) intelligent processing of the information contained within the data structure.

The ability to view terrain with such a large number of vertices is an important research area, where several in-core and out-of-core techniques have been developed. However, these prior art techniques require an expensive pre-processing stage which decimates the statistical accuracy of the original incoming data. Therefore, an urgent need exists because the volume and resolution of terrain data is growing faster than our ability to display it.

OBJECTS AND SUMMARY OF THE INVENTION

One object of the present invention is to provide a method for storing, manipulating, and processing of vertex information.

Another object of the present invention is to provide an algorithm-based method that intelligently processes the information contained within a data structure.

The invention disclosed herein provides a data structure and algorithm-based method for loading and/or displaying gridded datasets by adaptively loading data from an external data store and providing this information to a modern graphic processing unit in an acceptable form. In particular, the present invention uses independent view refinement criteria for determining the usefulness of a particular vertex of the gridded data, retrieves that data from some backing store and inserts that data into the Circular Linked List of Geometrical Relationship (CLLGR) data structure. When all necessary refinements have been completed, it dispatches the vertex information as a list of triangle fans for visualization. These refinements can be adaptive, such that more data may be fetched to satisfy the view refinement criteria, but a redraw occurs due to the desire to provide the user with a more responsive system. The data maybe be procedurally generated as is the case for fractally generated terrain or displaying of the WGS84 reference ellipsoid, or can be read from memory if the desired data has already been provided to a cache, or can be loaded from some other persistent storage device like a modern hard disk drive, or can be fetched from some web service or other network capable infrastructure.

An embodiment of the present invention provides a view refinement method and method for an out-of-core of the loading of NGA's DTED. The embodiment uses a screen projected node width approximation for ascertaining whether refinements, or simplifications, of the CLLGR are required. The loaded information is then projected into a user specified coordinate system that converts the source latitude and longitude tuples into geocentric vertex information. Two available projections comprise a flat earth projection and a World Geodetic 1984 (WGS84) projection; however there is no limitation to the types of projections that are possible.

A Simplified Example of the Display, Refinement and Decimation Processes of the Present Invention The method of the present invention resembles a Quadtree structure, where each IndexNode has an "up", "down", "left", and "right" pointer to another IndexNode. Each tree node consists of a center IndexNode (denoted as V0) and eight immediate neighbors, (see FIG. 1) Each TreeNode has zero or four children. An "IndexNode" is a structure which maintains unique mappings to other IndexNodes and has a Vertex for its Cartesian based information. A "TreeNode" is a collection of linked IndexNodes that encode some spatial relationship, and potentially child TreeNodes.

Display Process

1. Create one or more top level Tree Nodes.
   If more than one TreeNode is created then link neighboring TreeNodes where desired. For example, a cylinder could have two top level Tree Nodes, where traversing an IndexNode's right links would create a cycle. (see FIG. 2, where each top level node shares the same index node.)
2. Test each Tree Node based on the defined quality measurement
   2a. if the current representation is less than the desired goal, refine the node, see the description for the refinement process below. (see FIG. 3)
   2b. if the current representation exceeds the desired goal, decimate the node, see the description for the decimation process below. (see FIG. 7)
3. Generate triangle fans from the Tree Nodes for rendering. (see FIG. 5)
   3a. For each Tree Node start at the center Index Node (V0).
   3b. Transform the current vertex positional data into the desired coordinate system.
   3c. Add the transformed positional information to the end of an empty list.
   3d. Follow the "up" link.
   3e. Transform the current vertex positional data into the desired coordinate system.
   3f. Add the transformed positional information to the end of the list.
   3g. Follow the current vertex's "left" link.
   3h. Transform the current vertex positional data into the desired coordinate system.
   3i. Add the transformed positional information for this vertex to the end of the list.
   3j. If this vertex does not have a "down" link then go to step 3g.

3k. Follow the current vertex's "down" link.

3l. Add the transformed positional information for this vertex to the end of the list.

3m. If this vertex does not have a "right" link, or it's "right" link points to the originating vertex then go to step 3k.

3n. Follow the current vertex's "right" link.

3o. Add the transformed positional information for this vertex to the end of the list.

3p. If this vertex does not have an "up" link, or it's "up" link points to the originating vertex then go to step 3n.

3q. Follow the current vertex's "up" link.

3r. Add the transformed positional information for this vertex to the end of the list.

3s. If this vertex does not have a "left" link, or it's "left" link points to the originating vertex then go to step 3q.

3t. Follow the current vertex's "left" link.

3u. Add the transformed positional information for this vertex to the end of the list.

3v. If this vertex does not have a "down" link then go to step 3t.

3w. Add the transformed positional information for this vertex to the end of the list.

4. The list now contains a triangle fan that can be used by any modem graphics hardware. The display process can be easily modified eliminating the need to transform or to store the entire transformed vertex data as specified into other more effective data structures for particular hardware or graphics library.

Refinement Process (see FIG. 3)

1. Create 4 new TreeNodes (for example, named Node2, Node3, Node4, and Node5)

2. Create 16 new IndexNodes (for example, named a, b, c, d, e, f, g, h, i, j, k, l, m, n, o, and p)

3. Assign the new IndexNodes to their corresponding TreeNodes

4. Assign Children TreeNodes

5. Link IndexNodes together.

Decimation Process (see FIG. 7)

With the assumption that the decimation process is performed at the TreeNode that is required to meet the view refinement criteria, and that it has children, the decimation process can be described in simplified form. (see FIG. 7)

1. If my children have children, perform decimation process on each child 2. unlink 16 IndexNodes 3. clear out children It is within the scope of the present invention that it be modified to allow use of non-uniformly gridded data. Non-quad tree representations can also be employed, allowing for different refinement processes. Non-view dependent criteria can also be employed.

BRIEF DESCRIPTION OF THE DRAWINGS

FIG. 3B depicts the second and third steps in the process of refining a single node of the Circular Linked List of Geometrical Relationship (CLLGR).

FIG. 3C depicts the fourth and fifth steps in the process of refining a single node of the Circular Linked List of Geometrical Relationship (CLLGR).

FIG. 7A depicts the initial state and the first step in the process of decimating a single node of the CLLGR.

DETAILED DESCRIPTION OF THE PREFERRED EMBODIMENT

The present invention creates a forest of Triangle Fans from gridded data by using an independent refinement criteria, further enabling the display of real-time 3D depictions of larger than in-core memory datasets on modern graphics hardware. In particular, the present invention employs a continuous level of detail algorithm to display massive amounts of terrain data effectively.

The present invention exists in an Application Programmer's Interface form where it facilitates the visualization of unmodified global terrain information from the National Geospatial Intelligence Agency (NGA) in real-time on a variety of platforms. It is currently distributed with the JView API and being used on Macintosh, Linux and Windows computers that range from low-end Toshiba tough books up to high end visualization workstations. The highest end system that it has been tested consists of two Sony SRX-105 projectors driven from an 8 dual core processor computer from BOXX technologies with 32 GB of memory and two NVidia Quadro Plex IV's, driving the display at 7680 pixels by 2160 pixels.

Figure 1:
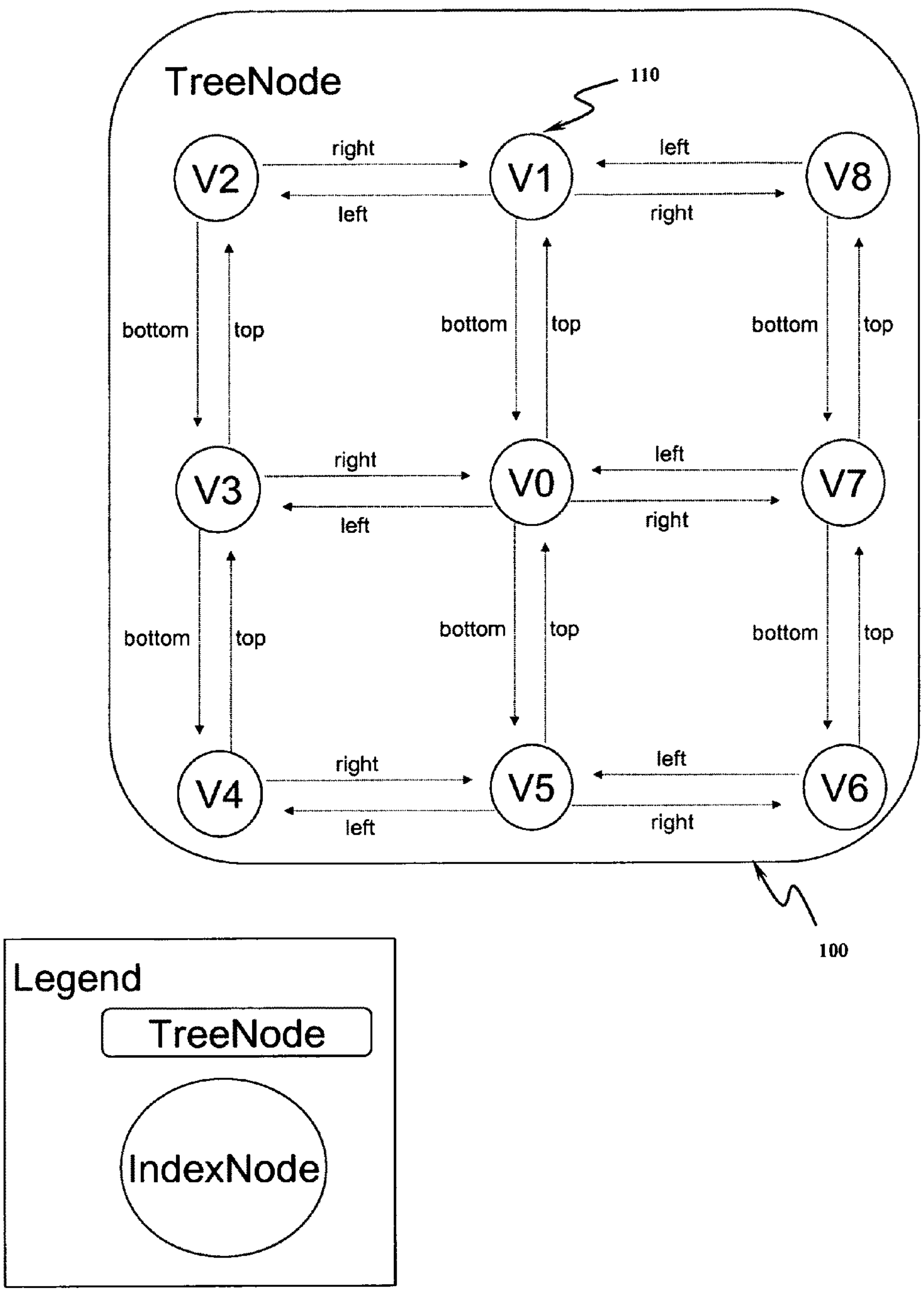
FIG. 1 depicts a single IndexNode, a single TreeNode, and their associated and interrelated named links.

Referring to FIG. 1, the data structures of the present invention are defined as TreeNodes and IndexNodes. TreeNodes 100 contain nine IndexNodes 110 designated as V0 through V8. A particular task can involve one or more TreeNodes. IndexNodes V0 through V8 are directly addressable by each TreeNode and represent the possible raw or un-projected vertex information. For example, an IndexNode could store the latitude, longitude, and altitude of a spot on the Earth, but to generate the actual vertex data, a projection needs to be applied to the data stored in the IndexNode. Alternatively, IndexNodes could also store the post projection data. This decision is based heavily on its projected use.

Figure 2:
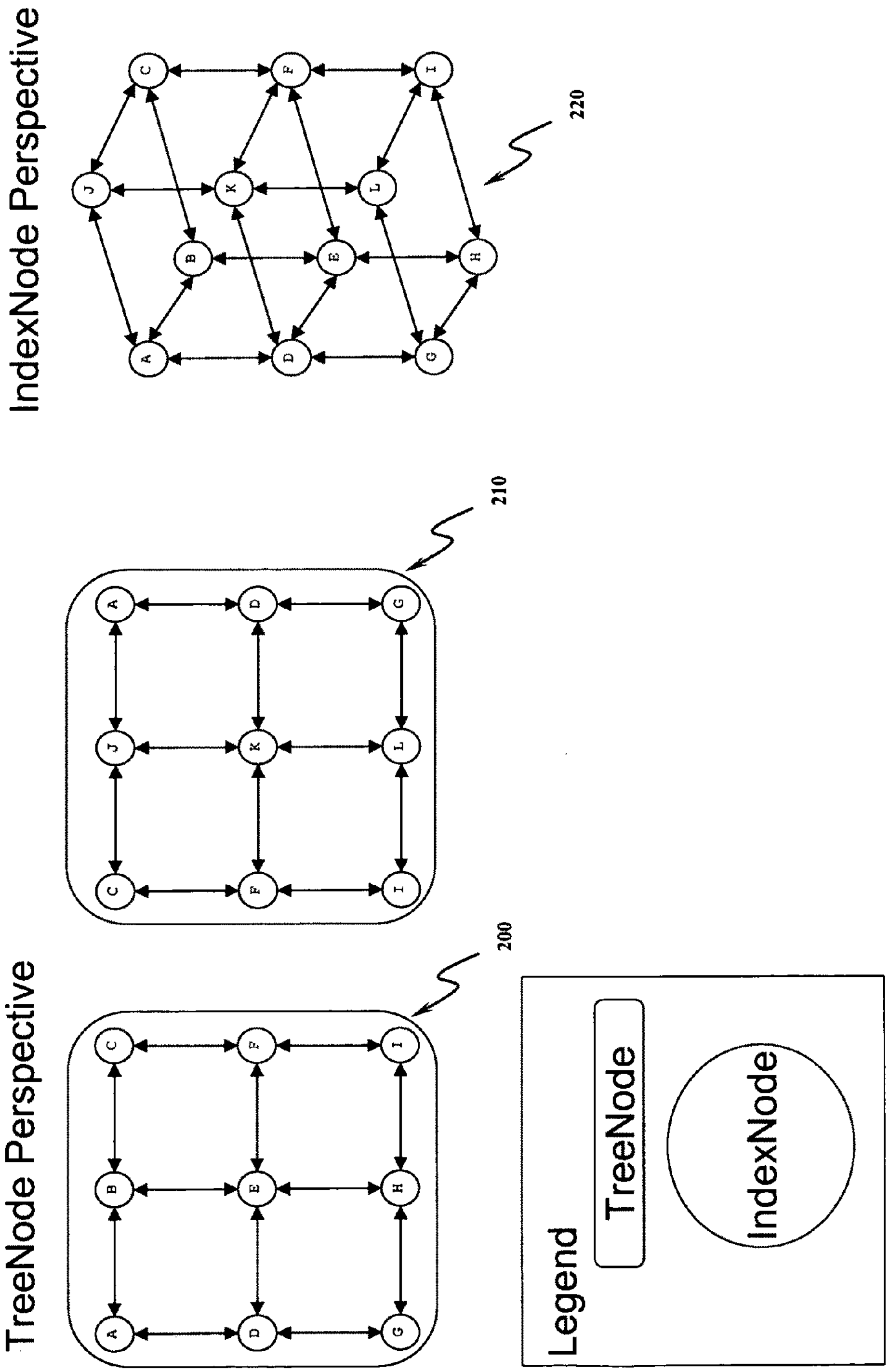
FIG. 2 depicts a top level that could be used to represent a cylinder which, in this depiction, has two top level TreeNodes sharing IndexNodes so as to create a completely connected and linked cycle.

Referring to FIG. 2, a first TreeNode 200 share edges with a second TreeNode 210 to form the finished geometry 220 by sharing the IndexNodes labeled A, D, G, C, F, and I. This creates the lowest quality version for this case. Each TreeNode directly accesses nine IndexNodes, but due to the sharing of some IndexNodes, there are only twelve unique IndexNodes.

Before displaying a particular level of refinement, a view refinement step can be taken first. This step essentially determines whether the current representation as stored by the tree of TreeNodes and IndexNodes satisfies the criteria. For this case, the assumptions made that one TreeNode failed the check and required refinement.

Figure 3A:
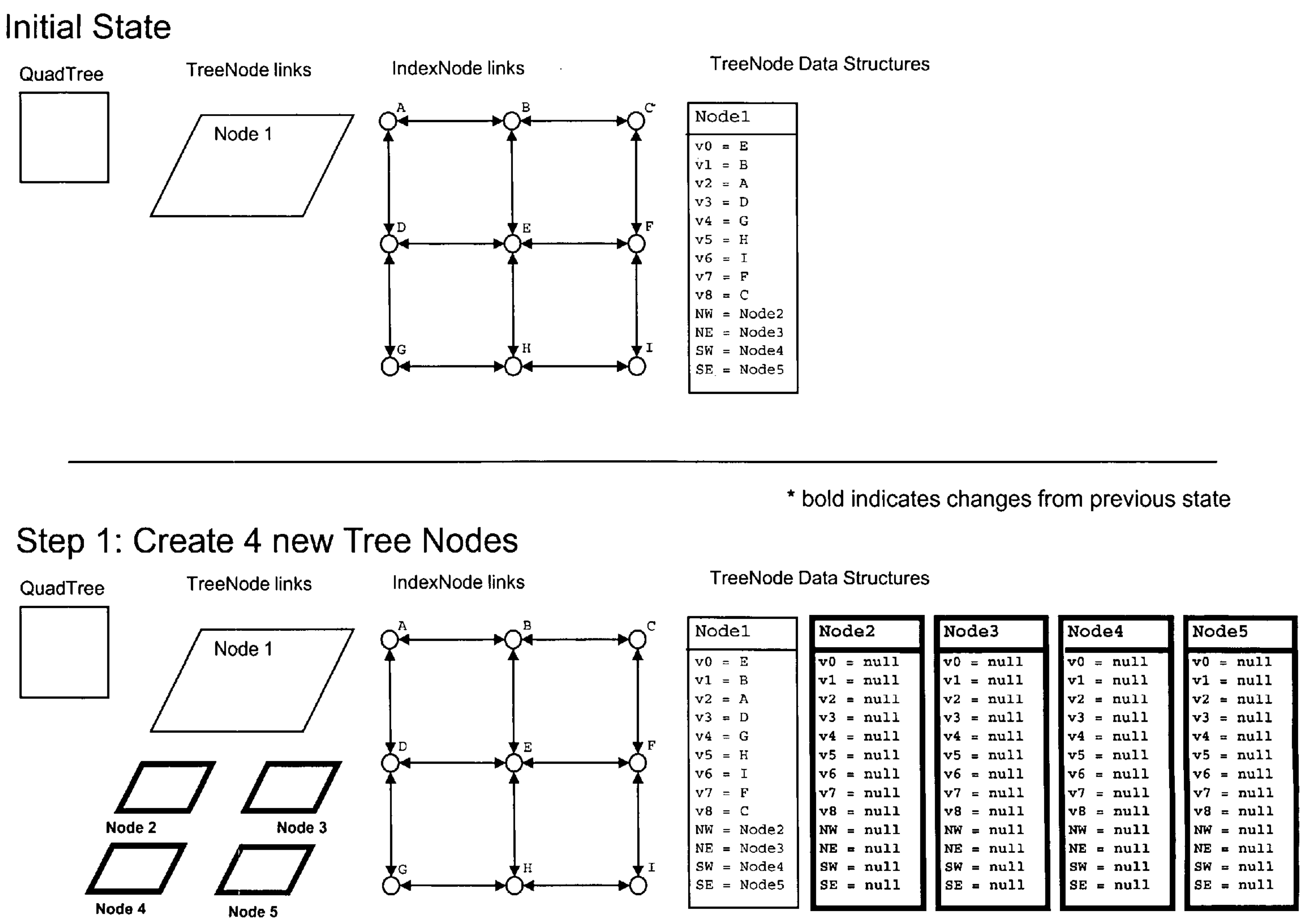
FIG. 3A depicts the initial state and first step in the process of refining a single node of the Circular Linked List of Geometrical Relationship (CLLGR).

Referring to FIG. 3A, depicts the initial state and corresponding data structures and the first step of view refinement process of the TreeNode (see FIG. 2, 210) that failed the check. Step 1 creates four TreeNode children.

Referring to FIG. 3B, depicts the second and third steps of view refinement process and corresponding data structures.

Step 2 creates up to sixteen new IndexNodes. If an IndexNode already exists that satisfies the geometric relationship, then the previously created IndexNode must be shared by these new IndexNodes. This is identical to the requirements for the TreeNodes as specified in FIG. 2. In this example the assumption is that no previously created IndexNodes satisfy the geometric relationship so sixteen new IndexNodes are created. Step 3 assigns the newly created IndexNodes to their respective TreeNodes. Notice that the sharing of IndexNodes is pervasive through this algorithm and is the basis for efficiency and effectiveness of the present invention.

Referring to FIG. 3C, depicts the fourth and fifth steps of view refinement process and corresponding data structures. Step 4 assigns the four newly created TreeNodes to the TreeNode that failed the view criteria. Step 5 then links the new IndexNodes together.

Figure 4:
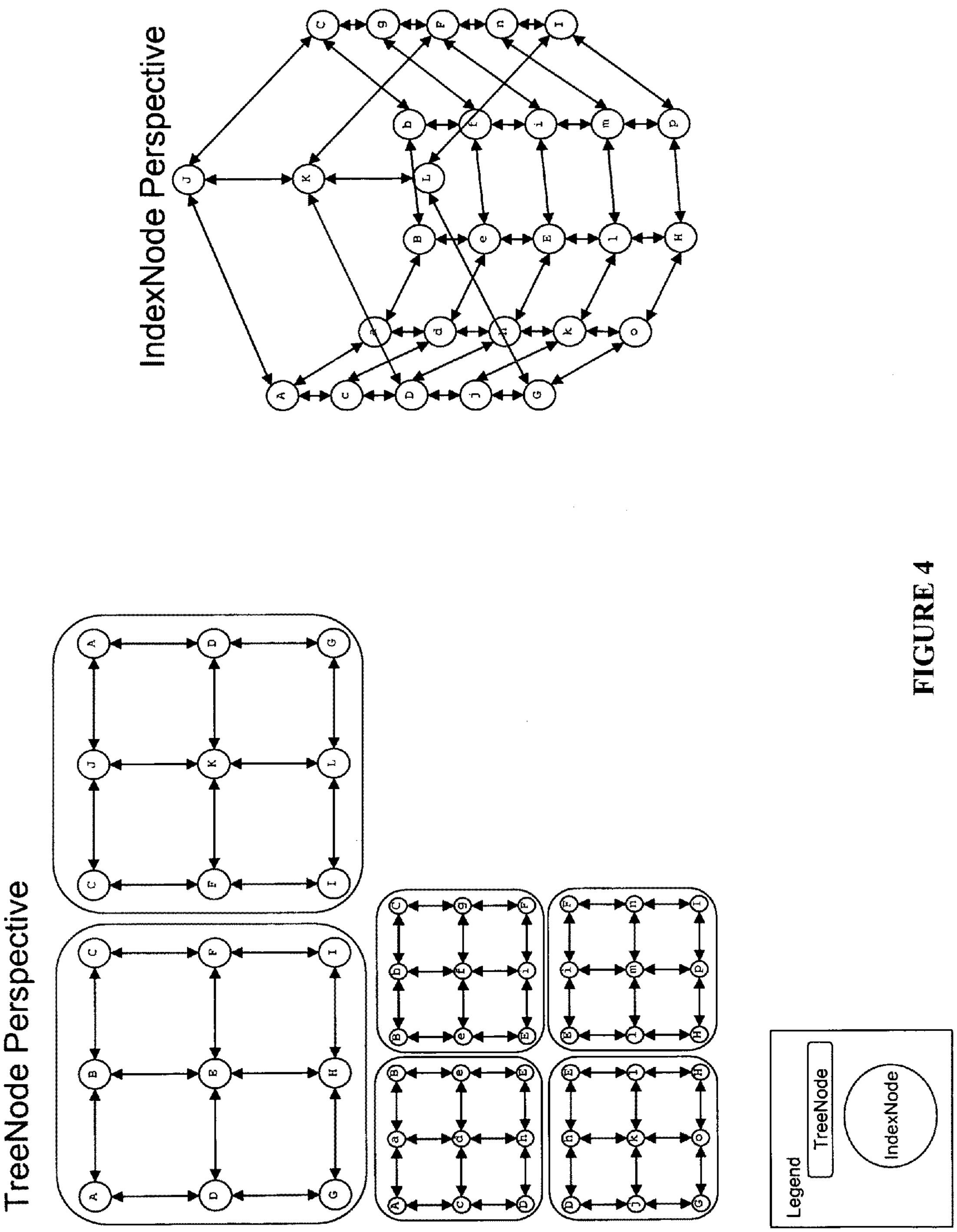
FIG. 4 depicts the data structure after one iteration of the process steps performed in FIG. 3A, FIG. 3B and FIG. 3C.

Referring to FIG. 4, shows that after IndexNode connections are created the ability to create a cycle by traversing about the IndexNodes is preserved.

Figure 5:
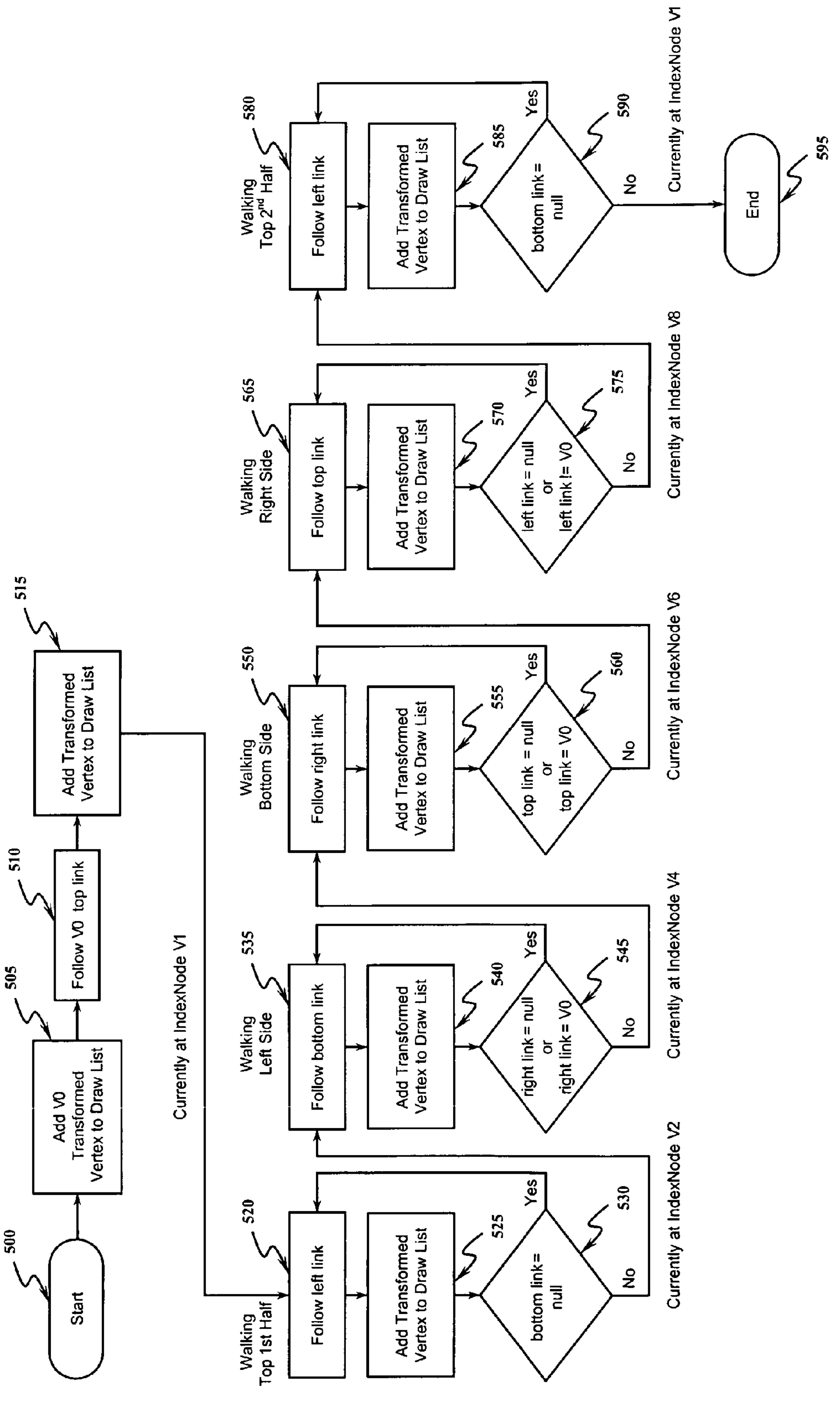
FIG. 5 depicts the process flow of the display process.

Referring to FIG. 5, following all necessary view refinements, the process of creating the triangle fans to be sent to the graphics card is commenced. The process commences 500 for all TreeNodes that do not have children. For each TreeNode, data is transformed from the IndexNode into the desired coordinate system and then added 505 to a list of vertices, referred to as the vertex list, for the triangle fan. That IndexNode's top link is followed 510. That new IndexNode's data is transformed into the desired coordinate system and added to the vertex list 515.

Still referring to FIG. 5, for each of the top first half, left side, bottom side, right side and top second half, the respective IndexNode's left link 520, bottom link 535, right link 550, top link 565 and left link 580 is traversed. Also, for each link traversed, respective transformed IndexNode's data is added 525, 540, 555, 570, 585 to the vertex draw list. If it is determined that an IndexNode has a bottom link, it is traversed, otherwise, the IndexNode's left link is traversed 530, 545, 560, 575, 590. This process continues until all directly accessible IndexNodes for a particular TreeNode have been traversed, at which point the process ceases 595. This may result in more than nine vertices being stored, since a neighbor may have refined.

Figure 6:
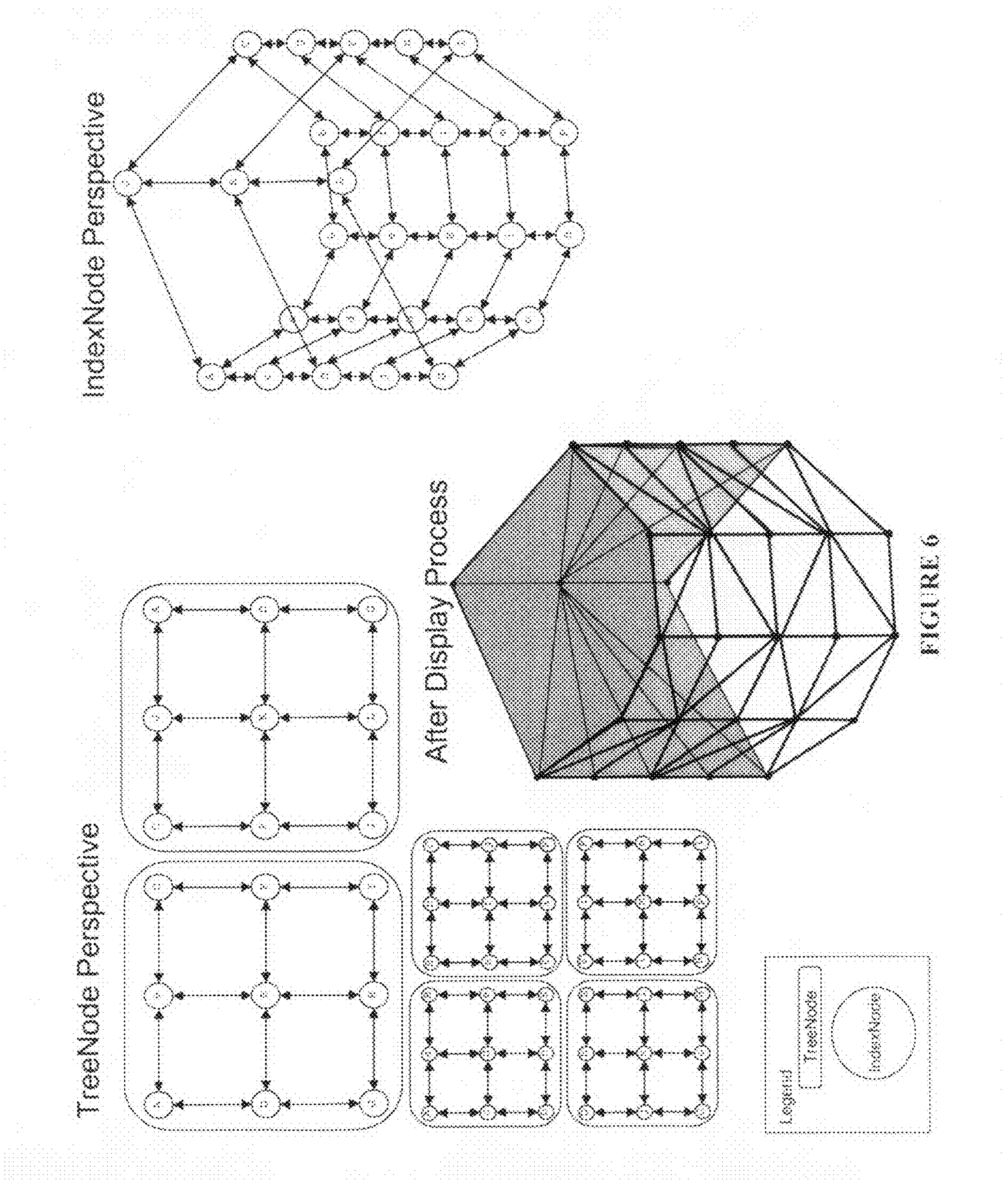
FIG. 6 depicts the application of the results of the display process depicted in FIG. 5 to the data structure as depicted in FIG. 4.

Referring to FIG. 6, after applying the display process explained in FIG. 5 to the data structure depicted in FIG. 2, the resultant triangle fans as shown would be generated. Each individual fan is shaded with a different pattern. Since there are five TreeNodes that do not have children, 5 triangle fans are created. The triangle fans avoid T-junctions by the fact that the IndexNodes are shared and thus neighbors that require additional levels of refinement are effectively inserting IndexNodes for multiple TreeNodes without the need for direct knowledge of their siblings.

Figure 7B:
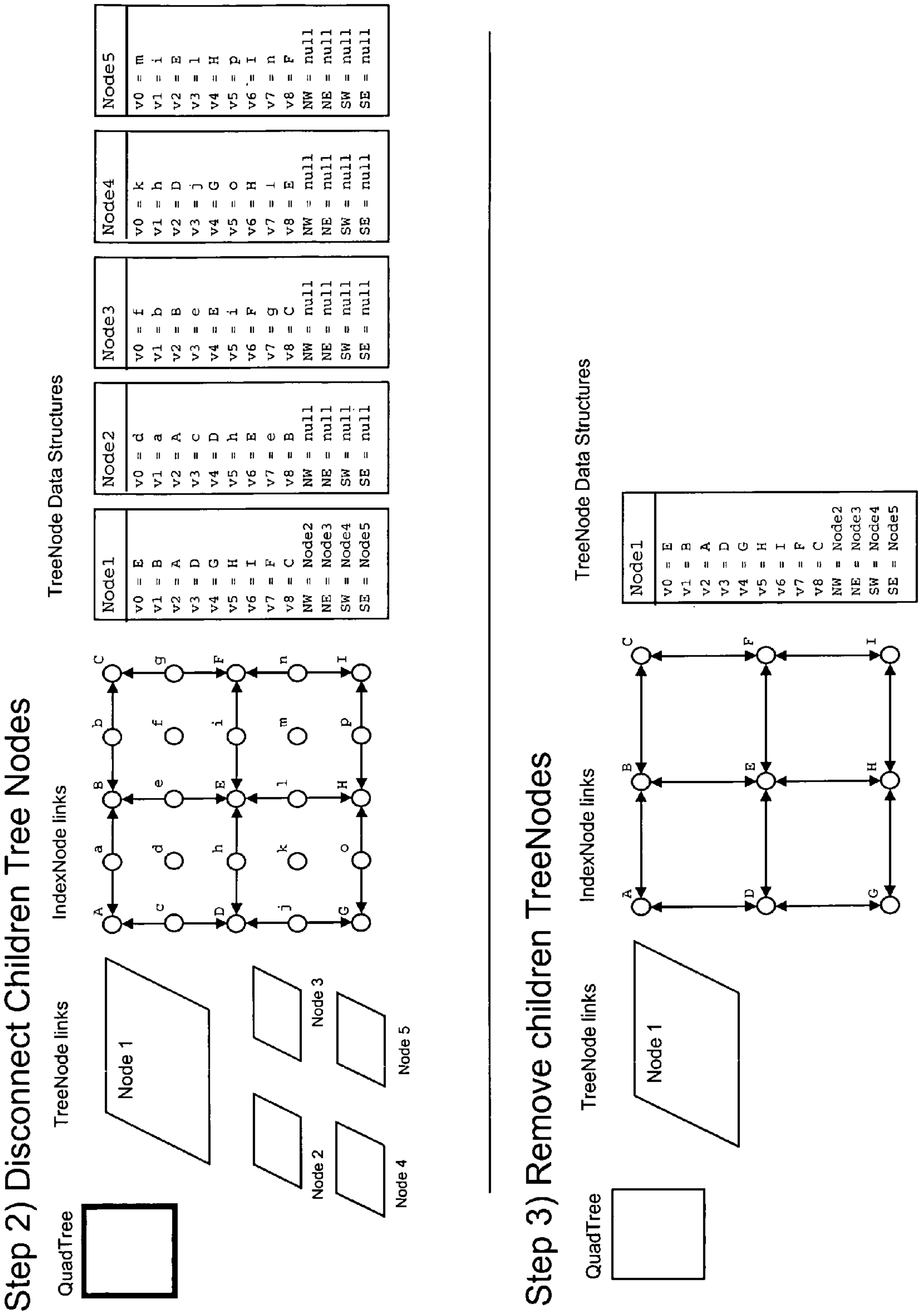
FIG. 7B depicts the second and third steps in the process of decimating a single node of the CLLGR.

Referring to FIG. 7A and FIG. 7B, when a current representation exceeds the desired goal, the present invention will perform the opposite of view refinement, that is, it will decimate the representation by first unlinking 16 Index Nodes, and decimating and clearing (i.e., removing) children tree nodes. The corresponding data structure is shown during the decimation process.

While the preferred embodiments have been described and illustrated, it should be understood that various substitutions, equivalents, adaptations and modifications of the invention may be made thereto by those skilled in the art without departing from the spirit and scope of the invention. Accordingly, it is to be understood that the present invention has been described by way of illustration and not limitation.

What is claimed is:

1. Method for displaying gridded datasets, comprising the steps of:
- creating at least one level tree node by a computer;
- IF more than one tree node is created, THEN
  - linking neighboring said tree nodes;
- OTHERWISE
  - measuring the defined quality of said at least one tree node;
  - IF said defined quality is less than a predetermined goal, THEN
    - refining a particular view, further comprising the steps of
      - determining the usefulness of a particular vertex of gridded data;
      - retrieving additional data so as to satisfy a view refinement criteria; and
      - performing a redraw;
  - OTHERWISE
  - IF said defined quality exceeds a predetermined goal, THEN
    - decimating a particular view;
  - OTHERWISE
  - generating triangle fans from said at least one tree node so as to facilitate their rendering as an input to a graphical display;

wherein said step of generating triangle fans further comprises the steps of:
- for each said at least one tree node, a first step of transforming the current vertex position of its originating center index node into a coordinate system of interest;
- a first step of adding said transformed current vertex position to an initially empty draw list;
- a first step of following said transformed current vertex's upward link to a first index node;
- a second step of transforming the current vertex position of said first index node into said coordinate system of interest;
- a second step of adding said transformed current vertex position of said first index node to the end of said draw list;
- determining whether said current vertex has a bottom link;
  - IF said current vertex does NOT have a bottom link, THEN
    - returning to said first step of following;
  - OTHERWISE
- a second step of following said transformed current vertex's downward link to a second index node;
- a third step of adding said transformed current vertex position of said second index node to the end of said draw list;
- determining whether said current vertex has a right link OR said right link points to said vertex position of said originating center index node;
  - IF said current vertex does NOT have a right link OR said right link points to said vertex position of said originating center index node, THEN
    - returning to said second step of following;
  - OTHERWISE
- a third step of following said transformed current vertex's rightward link to a third index node;
- a fourth step of adding said transformed current vertex position of said third index node to the end of said draw list;
- determining whether said current vertex has a top link OR said top link points to said vertex position of said originating center index node;

IF said current vertex does NOT have a top link OR said top link points to said vertex position of said originating center index node, THEN returning to said third step of following;

OTHERWISE a fourth step of following said transformed current vertex's upward link to a fourth index node; and a fifth step of adding said transformed current vertex position of said fourth index node to the end of said draw list;

determining whether said current vertex has a left link OR said left link points to said vertex position of said originating center index node;

IF said current vertex does NOT have a left link OR said left link points to said vertex position of said originating center index node, THEN returning to said fourth step of following;

OTHERWISE a fifth step of following said transformed current vertex's leftward link to a fifth index node;

a sixth step of adding said transformed current vertex position of said fifth index node to the end of said draw list;

determining whether said current vertex has a bottom link;

IF said current vertex does NOT have a bottom link, THEN returning to said fifth step of following;

OTHERWISE outputting said triangle fan to the input of a graphical display process.

2. A non-transitory tangible computer readable medium containing a computer executable program for displaying gridded datasets, wherein said computer executable program, when read, will cause a computer to perform the steps of:

creating at least one level tree node;

IF more than one tree node is created, THEN linking neighboring said tree nodes;

OTHERWISE measuring the defined quality of said at least one tree node;

IF said defined quality is less than a predetermined goal, THEN refining a particular view, further comprising the steps of determining the usefulness of a particular vertex of gridded data;

retrieving additional data so as to satisfy a view refinement criteria; and performing a redraw;

OTHERWISE

IF said defined quality exceeds a predetermined goal, THEN decimating a particular view;

OTHERWISE generating triangle fans from said at least one tree node so as to facilitate their rendering as an input to a graphical display;

wherein within said step of generating triangle fans, said computer executable program further causes said computer to perform the steps of:

for each said at least one tree node, a first step of transforming the current vertex position of its originating center index node into a coordinate system of interest;

a first step of adding said transformed current vertex position to an initially empty draw list;

a first step of following said transformed current vertex's upward link to a first index node;

a second step of transforming the current vertex position of said first index node into said coordinate system of interest;

a second step of adding said transformed current vertex position of said first index node to the end of said draw list;

determining whether said current vertex has a bottom link;

IF said current vertex does NOT have a bottom link, THEN returning to said first step of following;

OTHERWISE a second step of following said transformed current vertex's downward link to a second index node;

a third step of adding said transformed current vertex position of said second index node to the end of said draw list;

determining whether said current vertex has a right link OR said right link points to said vertex position of said originating center index node;

IF said current vertex does NOT have a right link OR said right link points to said vertex position of said originating center index node, THEN returning to said second step of following;

OTHERWISE a third step of following said transformed current vertex's rightward link to a third index node;

a fourth step of adding said transformed current vertex position of said third index node to the end of said draw list;

determining whether said current vertex has a top link OR said top link points to said vertex position of said originating center index node;

IF said current vertex does NOT have a top link OR said top link points to said vertex position of said originating center index node, THEN returning to said third step of following;

OTHERWISE a fourth step of following said transformed current vertex's upward link to a fourth index node; and a fifth step of adding said transformed current vertex position of said fourth index node to the end of said draw list;

determining whether said current vertex has a left link OR said left link points to said vertex position of said originating center index node;

IF said current vertex does NOT have a left link OR said left link points to said vertex position of said originating center index node, THEN returning to said fourth step of following;

OTHERWISE a fifth step of following said transformed current vertex's leftward link to a fifth index node;

a sixth step of adding said transformed current vertex position of said fifth index node to the end of said draw list;

determining whether said current vertex has a bottom link;

IF said current vertex does NOT have a bottom link, THEN returning to said fifth step of following;

OTHERWISE outputting said triangle fan to the input of a graphical display process.

3. Apparatus for displaying gridded datasets, comprising:

means for creating at least one level tree node;

IF more than one tree node is created, THEN means for linking neighboring said tree nodes;

OTHERWISE means for measuring the defined quality of said at least one tree node;

IF said defined quality is less than a predetermined goal, THEN means for refining a particular view, further comprising means for determining the usefulness of a particular vertex of gridded data;

retrieving additional data so as to satisfy a view refinement criteria; and means for performing a redraw;

OTHERWISE

IF said defined quality exceeds a predetermined goal, THEN means for decimating a particular view;

OTHERWISE means for generating triangle fans from said at least one tree node so as to facilitate their rendering as an input to a graphical display;

wherein said means for generating triangle fans further comprises means for:

for each said at least one tree node, a first means for transforming the current vertex position of its originating center index node into a coordinate system of interest;

a first means for adding said transformed current vertex position to an initially empty draw list;

a first means for following said transformed current vertex's upward link to a first index node;

a second means for transforming the current vertex position of said first index node into said coordinate system of interest;

a second means for adding said transformed current vertex position of said first index node to the end of said draw list;

means for determining whether said current vertex has a bottom link;

IF said current vertex does NOT have a bottom link, THEN means for returning to said first step of following;

OTHERWISE a second means for following said transformed current vertex's downward link to a second index node;

a third means for adding said transformed current vertex position of said second index node to the end of said draw list;

means for determining whether said current vertex has a right link OR said right link points to said vertex position of said originating center index node;

IF said current vertex does NOT have a right link OR said right link points to said vertex position of said originating center index node, THEN means for returning to said second step of following;

OTHERWISE a third means for following said transformed current vertex's rightward link to a third index node;

a fourth means for adding said transformed current vertex position of said third index node to the end of said draw list;

means for determining whether said current vertex has a top link OR said top link points to said vertex position of said originating center index node;

IF said current vertex does NOT have a top link OR said top link points to said vertex position of said originating center index node, THEN means for returning to said third step of following;

OTHERWISE a fourth means for following said transformed current vertex's upward link to a fourth index node; and a fifth means for adding said transformed current vertex position of said fourth index node to the end of said draw list;

means for determining whether said current vertex has a left link OR said left link points to said vertex position of said originating center index node;

IF said current vertex does NOT have a left link OR said left link points to said vertex position of said originating center index node, THEN means for returning to said fourth step of following;

OTHERWISE a fifth means for following said transformed current vertex's leftward link to a fifth index node;

a sixth means for adding said transformed current vertex position of said fifth index node to the end of said draw list;

means for determining whether said current vertex has a bottom link;

IF said current vertex does NOT have a bottom link, THEN means for returning to said fifth step of following;

OTHERWISE means for outputting said triangle fan to the input of a graphical display process.

* * * * *